UNITED STATES PATENT OFFICE.

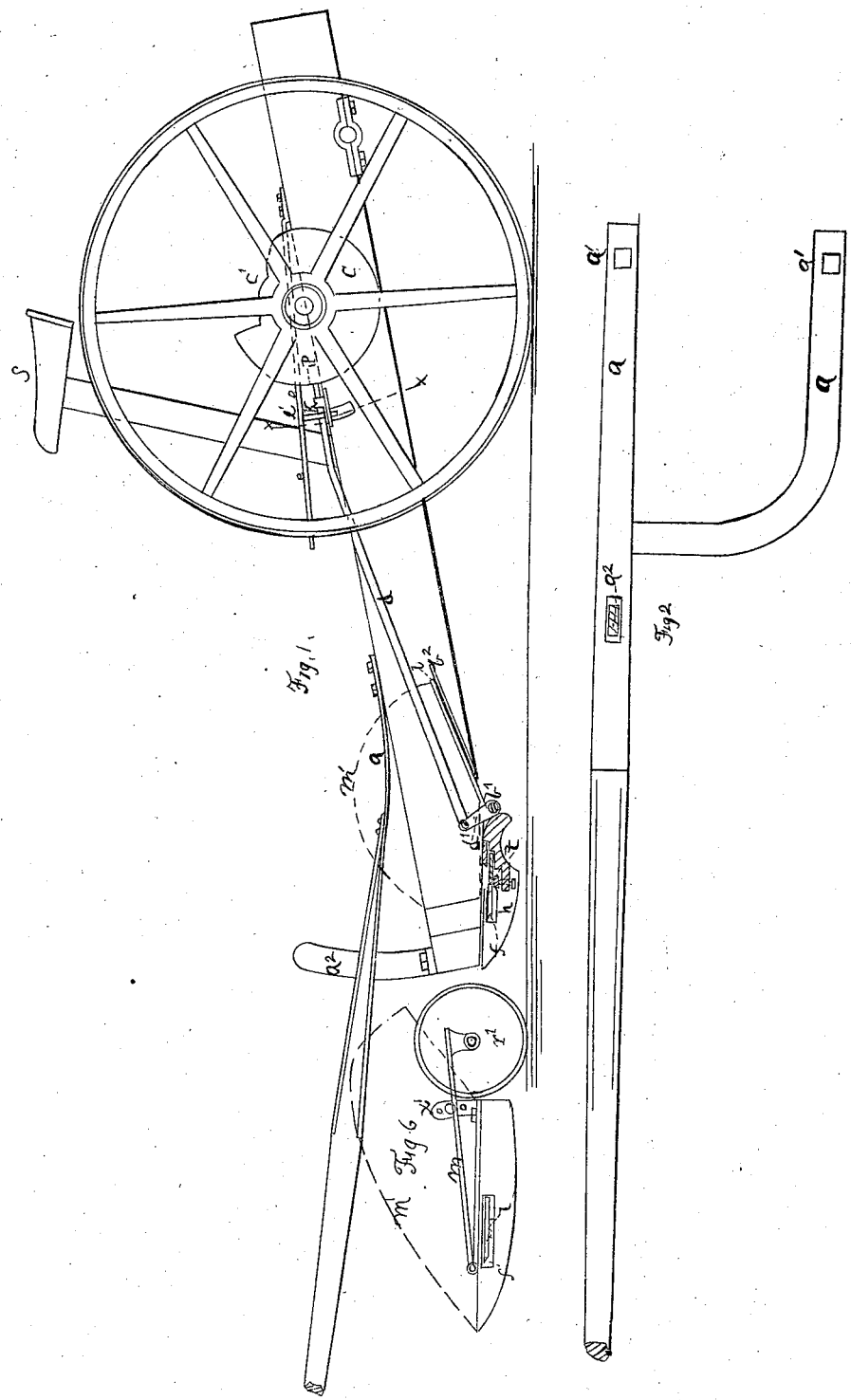

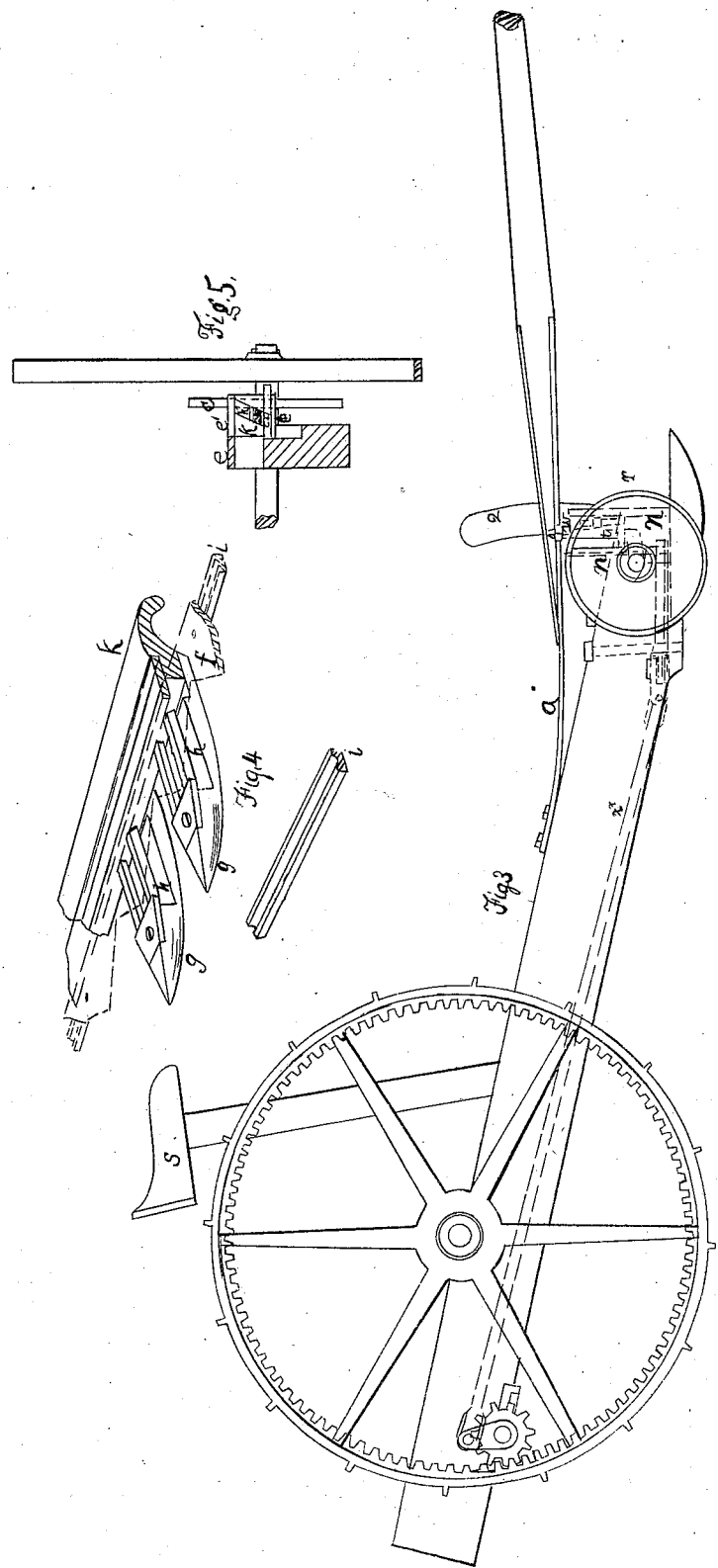

JOHN E. NEWCOMB, OF WHITEHALL, NEW YORK.

IMPROVEMENT IN GRAIN-HARVESTERS.

Specification forming part of Letters Patent No. 12,215, dated January 9, 1855.

*To all whom it may concern:*

Be it known that I, JOHN E. NEWCOMB, of Whitehall, in the county of Washington and State of New York, have invented certain Improvements in Mowing and Reaping Machines; and I do hereby declare that the following is a full, clear, and exact description of the principle or character which distinguishes them from all other things before known, and of the usual manner of making, modifying, and using the same, reference being had to the accompanying drawings.

Figure 1 is an elevation taken from the left side of the machine. Fig. 2 is a top view of the tongue. Fig. 3 is an elevation taken from the right side of the machine. Fig. 4 is an enlarged detached view of the scythe-plate, grooved rod, and fingers or guides. Fig. 5 is a section through the line $x\ x$ of Fig. 1. Fig. 6 is a detached view of the gage-wheel on the left side of the reaper.

My improvements consist in a new mode of attaching the tongue to the carriage of the reaper; a mode of delivering the grain by causing the apron to drop at intervals; a mode of varying the size of the apron; a mode of keeping up the scythe-blade to the shear-edges of the fingers or guides, and a mode of regulating the height of the machine so as to make it answer for a reaper and mower.

Instead of the usual mode of attaching the tongue to the frame or carriage by a swivel-joint, I attach it by means of a strong spring-piece, $a\ a$, of iron or other material, the spring being bolted to the frame at the ends $a'\ a'$.

To prevent the tongue from twisting about I make a slot in the tongue, through which passes the upright guide-piece $a^2$, so as to admit of free play of the tongue vertically and restrain its lateral motions and twisting.

The mode of delivering the grain is as follows: The apron $b$, upon which the grain is received after it is cut by the scythes, is hinged at $b'$, and by a simple mechanical contrivance is made to drop its load at proper intervals. This is effected by the action of the cam $c$, fixed to the axis of the driving-wheel upon the rod $d$ and crank $d'$, connected with the apron so as to move it upon its hinged joint. While the connecting-rod presses upon the periphery of the cam it holds the apron up; but when the connecting-rod falls into the depression $c'$ of the cam the apron falls by its own weight.

In order to prevent the grain from running over the apron before it drops, I make the apron extensible at pleasure by the addition of an extra or sliding apron, $b^2$, placed under the apron $b$ and movable back and forth at pleasure, and kept in place by the ordinary devices of guides or ways and set-screws.

There may be various ways adopted of effecting the regular depression and elevation of the apron or "platform," as it is sometimes called; and I do not claim the present mode of doing it, as I regard the dropping of the apron at intervals irrespective of the means as the important feature of my improvement. When the machine is used as a mower for grass the apron must be taken off from the machine.

Various mechanical devices may be adopted to work the apron, and I have merely shown one, not intending to claim it. As represented in the drawings, the rod $d$ is out of gear with the cam $c$, and it is thrown into gear by the depression of the spring $e$ by the foot of the rider, who sits on the seat $s$. This is effected as follows: The spring $e$ is attached at the rear end to the side beam of the carriage, its forward end being free. At the point $e'$ there is an ear or projecting piece, (see Fig. 5,) from which projects downward a slotted piece, $k$, the oblique slot being indicated by $k'$. It will be seen that the rod $e$ passes through this slot and is pushed from side to side or thrown out of gear by the motion up and down of the slotted piece. The motion of the rod is checked when out of gear by the check-piece $p$ on the side beam of the carriage, (shown in Fig. 1,) and which also appears within the slot $k$ in Fig. 5. Therefore when the driver's foot is upon spring $e$ the apron works, and vice versa.

There are many ways of throwing the apron in and out of action, and I do not now claim the mode which I have shown, as I regard the improvement to consist in controlling the working of the apron by throwing it in and out of gear at pleasure. The scythe-plate $f$ is driven back and forth by the usual mode of gearing adopted in reaping-machines.

Great difficulty under almost every variety of construction in these machines has been experienced in consequence of the clogging of the scythe by the grass and straw getting between the scythe and the fingers or guides. I provide against this by a contrivance for keeping the scythe-plate closely against the shear-edges of the guides or fingers, which leaves a clear open space, $h$, under the scythe-plate for the escape of fine grass, &c. Various attempts have been made to effect this object; but the downward pressure upon the scythe would require so much counteracting pressure to keep it up the friction would become excessive. This difficulty I obviate by the use of a grooved bar, $i$, under the scythe-plate, the grooved bar being kept up against the scythe-plate by set-screws. The object of this grooved bar is to exert the proper pressure to keep the scythe up against the shear-edges, and yet to obviate excessive friction by keeping the groove filled with oil, which is to be poured in at proper times through suitable apertures through the scythe-plate.

In order to adapt my machine to the twofold purposes of reaping and mowing, I attach to each side in front adjustable wheels, and make the wheel on the right side a caster-wheel, which turns about a pivot as well as upon its axis. The wheel $r$ is the caster-wheel. The pivot $t$ of this wheel turns in a head, $w$, movable up and down in the guides $n\ n$, and held in place by set-screws in the common way. The wheel $r'$, Fig. 6, is adjustable up and down by means of the hinged arm $m$ and the standard $x$ passing through a slot in the arm $m$, and pierced with numerous holes to receive check-pins after the usual manner of adjusting gage-wheels in plows, &c. The red lines $m'\ m'$ indicate merely side boards to the reaper. The scythe is worked back and forth by means of a rod, $x^2$, operating upon a bell-crank in the usual manner.

What I claim as my invention is—

1. Making the hinged apron extensible, substantially in the manner set forth.

2. The mode of keeping the scythe-plate to the shear-edges of the guides, said mode consisting in the employment of a grooved pressure plate or bar and set-screws, for the purposes herein set forth.

J. E. NEWCOMB.

Witnesses:
E. FOREMAN,
E. SHAW.